(12) United States Patent
Edwards

(10) Patent No.: US 9,330,164 B1
(45) Date of Patent: May 3, 2016

(54) ELECTRONIC PLATFORM FOR USER CREATION AND ORGANIZATION OF GROUPS OF MEMBER PROFILES TO AID IN MEMORIZATION OF SELECTED INFORMATION

(71) Applicant: Andrew Wills Edwards, Tulsa, OK (US)

(72) Inventor: Andrew Wills Edwards, Tulsa, OK (US)

( * ) Notice: Subject to any disclaimer, the term of this patent is extended or adjusted under 35 U.S.C. 154(b) by 213 days.

(21) Appl. No.: 14/030,585

(22) Filed: Sep. 18, 2013

Related U.S. Application Data

(60) Provisional application No. 61/718,987, filed on Oct. 26, 2012.

(51) Int. Cl.
*G06F 7/00* (2006.01)
*G06F 17/30* (2006.01)

(52) U.S. Cl.
CPC ...... *G06F 17/30598* (2013.01); *G06F 17/3028* (2013.01); *G06F 17/30312* (2013.01)

(58) Field of Classification Search
None
See application file for complete search history.

(56) References Cited

U.S. PATENT DOCUMENTS

| | | | |
|---|---|---|---|
| 5,494,444 A | 2/1996 | Thayer et al. | |
| 6,269,369 B1 | 7/2001 | Robertson | |
| 6,641,402 B2 | 11/2003 | Boggs | |
| 7,080,982 B2 * | 7/2006 | Rawlins | G09B 3/00 434/156 |
| 7,124,164 B1 | 10/2006 | Chemtob | |
| 7,828,551 B2 | 11/2010 | Bowers | |
| 8,108,786 B2 | 1/2012 | Tucci | |
| 8,137,107 B2 | 3/2012 | Bantz et al. | |
| 2002/0078150 A1 | 6/2002 | Thompson et al. | |
| 2003/0175667 A1 | 9/2003 | Fitzsimmons, Jr. | |
| 2006/0216685 A1 | 9/2006 | Brodie et al. | |
| 2007/0218441 A1 * | 9/2007 | Delahunt et al. | 434/236 |
| 2008/0140596 A1 | 6/2008 | Xiao | |
| 2009/0136910 A1 | 5/2009 | Mayost et al. | |
| 2009/0248960 A1 * | 10/2009 | Sunderland | G06F 17/30 711/103 |
| 2010/0219936 A1 | 9/2010 | Gabara | |
| 2011/0091859 A1 | 4/2011 | Hall | |
| 2011/0136085 A1 | 6/2011 | Leroy | |
| 2011/0153339 A1 | 6/2011 | Buck et al. | |
| 2011/0229868 A1 | 9/2011 | Chu | |
| 2011/0244437 A1 * | 10/2011 | Hilker | 434/309 |

(Continued)

FOREIGN PATENT DOCUMENTS

| | | |
|---|---|---|
| CA | 2752107 | 1/2013 |
| KR | 2002095824 | 12/2002 |

(Continued)

OTHER PUBLICATIONS

• HeadDetail: http://headdetail.com/.

(Continued)

*Primary Examiner* — Uyen Le
(74) *Attorney, Agent, or Firm* — Head, Johnson & Kachigian, P.C.

(57) ABSTRACT

An electronic platform allowing users to form and organize groups of member profiles, which contain a number of biographical categories (e.g., name, address, etc.) and a personal photo. The electronic platform incorporates many different methods of testing the user to assist in the memorization of the faces and biographical information of the members of the group, i.e., electronic flash cards (one sided or two sided), multiple choice quizzes, etc. The users then may either create their own custom tests or they may use predesigned quizzes generated by the electronic platform.

18 Claims, 16 Drawing Sheets

(56) References Cited

U.S. PATENT DOCUMENTS

| | | | |
|---|---|---|---|
| 2011/0275048 A1 | 11/2011 | Hussain | |
| 2011/0318723 A1* | 12/2011 | Jeong | G09B 7/08 434/350 |
| 2012/0052474 A1 | 3/2012 | Voehl et al. | |
| 2012/0270200 A1 | 10/2012 | Stearns | |
| 2013/0007621 A1* | 1/2013 | Warren | 715/733 |

FOREIGN PATENT DOCUMENTS

| | | |
|---|---|---|
| KR | 20100077450 | 7/2010 |
| KR | 1042324 | 6/2011 |
| KR | 20110094814 | 8/2011 |

OTHER PUBLICATIONS

• Lumosity: http://www.lumosity.com/ http://www.lumosity.com/brain-games/memory-games/familiar-faces http://www.lumosity.com/blog/face-name-recall-remembering-new-people-you-meet-during-theholidays/.
• Cognifit: http://www.cognifit.com/.
• http://homeworktips.about.com/b/2011/11/06/group-memorization-activity.htm.
Chen; Ubiquitous learning website: Scaffold learners by mobile devices with information-aware techniques; Computers & Education, vol. 50, Issue 1, Jan. 2008, pp. 77-90.
Picard: a creative and social online flashcard learning game; Proceedings of the International Conference on the Foundations of Digital Games, pp. 231-234,New York, NY, USA © 2012.
Quizlet; http://quizlet.com/how-it-works.
Remember the Name, a Windows Phone app to help putting a face with a name by George Ponder, Tuesday, Jul. 2, 2013 at 8:33 am.
Application entitled e-Faces and Names by MyBrainSolutions.
Gist adds Learn that Name to iPhone app to help you remember your contacts by Greg Meyer | Mar. 17, 2010.
Application entitled Remember My Name With Knome: name recall.
http://www.whoodl.com/ Application entitled Whoodl.

* cited by examiner

ELECTRONIC PLATFORM FOR USER CREATION AND ORGANIZATION OF GROUPS OF MEMBER PROFILES TO AID IN MEMORIZATION OF SELECTED INFORMATION

CROSS REFERENCE TO RELATED APPLICATIONS

This application claims the benefit of U.S. Provisional Patent Application Ser. No. 61/718,987, filed Oct. 26, 2012, which is incorporated herein by reference in its entirety.

STATEMENT REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A SEQUENCE LISTING, A TABLE, OR A COMPUTER PROGRAM LISTING APPENDIX

Not Applicable.

BACKGROUND OF THE INVENTION

1. Field of the Invention

This invention relates generally to an electronic platform for forming and organizing groups of member profiles consisting essentially of biographical information, such as name, address, phone number, and a personal photo of the member, and more particularly, but not by way of limitation, to a computer system and mobile application for user creation and organization of groups of member profiles to aid in memorization of key biographical information.

2. Description of the Related Art

Students, members of Greek organizations, corporate employees and executives, athletes, conference attendees, educators, and countless others often face the task (and in many cases, the problem) of memorizing the names, faces, and biographical information of members of a group. These individuals, as well as companies and organizations, which possess the need to facilitate the familiarization, greater interaction, and memorization of the members of their groups and/or event attendees must relegate themselves to the use of insufficient methods, such as Microsoft PowerPoint®, nametags, business cards, paper flash cards, and others similar to these methods. These current methods do not include the features of memorizing and increasing group social familiarity, "gamifing" the experience, and connecting users to members of their groups on a much deeper level.

Based on the foregoing, it is desirable to provide an electronic platform that enables users to form and organize groups of member profiles, which contain a small but essential number of biographical categories, such as name, address, phone number, and personal photograph.

It is further desirable to provide a computing platform that upon completion of group formation, member sign up (such via Facebook®, LinkedIn®, a Google® account, or native email-username and password generation), and profile population, members of groups will have access to digital flash cards and computerized multiple choice quizzes generated by the system to aid them in the memorization of their fellow members' biographical information.

It is still further desirable to provide a computing platform that allows users to tailor the electronic flash cards and quizzes more specifically on biographical member categories of their choosing and as needed.

It is yet further desirable to provide a mobile computing application that synchronizes seamlessly with the iOS®, Android®, and Windows® phone platforms, as well as a Facebook® and LinkedIn® application, thereby granting users access to digital flash cards and computerized multiple choice quizzes conveniently on their mobile devices so that they may practice group memorization with ease at their convenience.

SUMMARY OF THE INVENTION

In general, in a first aspect, the invention relates to a computerized system for forming and organizing groups of member profiles. The system includes a computer network with a plurality of computers having access to the computer network, and an electronic platform in the computer network. The electronic platform is configured to receive requests from any one of the plurality of computers. The electronic platform includes a database of biographical information organized into groups of member profiles, and an interface in communication with the database. The interface is configured to access the groups of member profiles, and is also configured to aid in memorization the biographical information.

In general, in a second aspect, the invention relates to a computerized method for memorizing biographical information of a group. The computerized method includes the steps of organizing a database of biographical information into a plurality of groups. The groups have a plurality of member profiles associated therewith. The method also includes providing an application capable of communicating with the database, and directing the application to select one or more of the groups so as to select a member's biographical information. A memorization means dynamically replicates the biographical information, which is then displayed to the user for testing.

Figure 1:
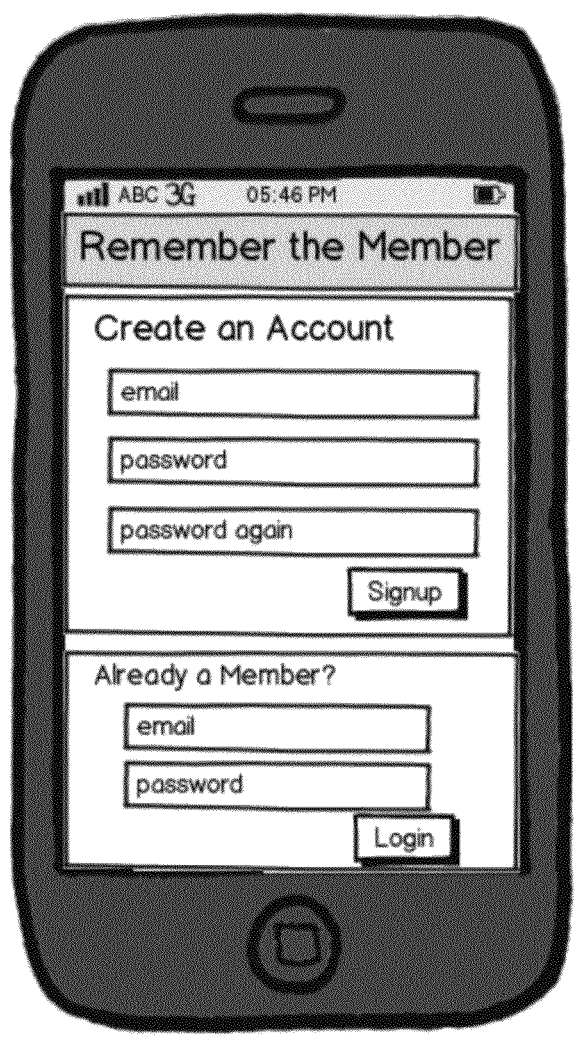
FIG. 1 is a mobile wireframe of the electronic platform for user creation and organization of groups of member profiles to aid in memorization biographical information disclosed herein.

Other advantages and features will be apparent from the following description and from the claims.

DETAILED DESCRIPTION OF THE INVENTION

The systems and methods discussed herein are merely illustrative of specific manners in which to make and use this invention and are not to be interpreted as limiting in scope.

While the systems and methods have been described with a certain degree of particularity, it is to be noted that many modifications may be made in the details of the construction and the arrangement of the devices, components and/or steps without departing from the spirit and scope of this disclosure. It is understood that the systems and methods are not limited to the embodiments set forth herein for purposes of exemplification.

In general, the invention relates to an electronic platform for user creation and organization of groups of member profiles to aid in memorization of key biographical information. The electronic platform may be implemented through a computer program/application loaded on a standard computer device, such as a mainframe, desktop or other computer. For example, the computer device may have a central processor that controls the overall operation of the computer and a system bus that connects the central processor to one or more conventional components, such as a network card or modem. The computer device may also include a variety of interface units and drives for reading and writing data or files.

The electronic platform may be a stand-alone computer program/application designed to be packaged/embedded with any standard computer program/application ("host software application"). The electronic platform may include a client application, a server application, a file repository and database for storage of images and information, and/or a database for storage of unique member and group identifier numbers. The electronic platform may be implemented with one or more mainframe, desktop or other computer. For example, a computer device may use a 64-bit processor. Each computer device of the electronic platform includes a central processor that controls the overall operation of the computer and a system bus that connects the central processor to one or more conventional components, such as a network card or modem. Each computer device may also include a variety of interface units and drives for reading and writing data or files. Depending on the type of computer device, a user can interact with the computer using a keyboard, pointing device, microphone, pen device or other input device. The electronic platform may be connected via a suitable network connection, such as a T1 line, a common local area network ("LAN") or other mechanism for connecting computer devices. In addition, the electronic platform may include an application program that is resident on and run by a handheld, portable electronic device, such as a cell phone platform, for example Blackberry®, iPhone® or other smartphone electronic device or personal digital assistant ("PDA").

The electronic platform allows users to form and organize groups of member profiles, which contain a number of key biographical categories (e.g., name, address, etc.) and a personal photograph. The electronic platform incorporates many different methods of testing the user to assist in the memorization of the faces and biographical information of the members of the group, i.e., electronic flash cards (one sided or two sided), multiple choice quizzes, etc. The users then may either create their own custom tests or they may use predesigned quizzes generated by the electronic platform. In addition, users could sign up directly from the electronic platform or they could use a third party sign up, such as Facebook®, LinkedIn® or Google®. The electronic platform can also include mobile applications that would sync with iOS®, Android® and Windows® as well as a Facebook® or LinkedIn® application. Further, each group can customize the electronic platform, such as using a visual and color scheme that is fully tailored to the group's themes and logos.

Figure 2:
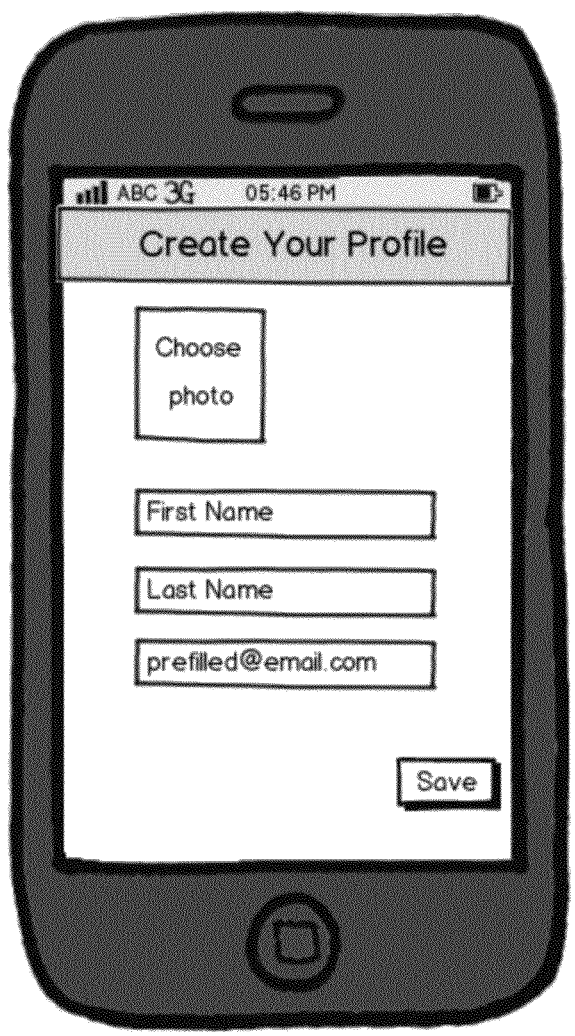
FIG. 2 is another mobile wireframe of the electronic platform.
Figure 3:
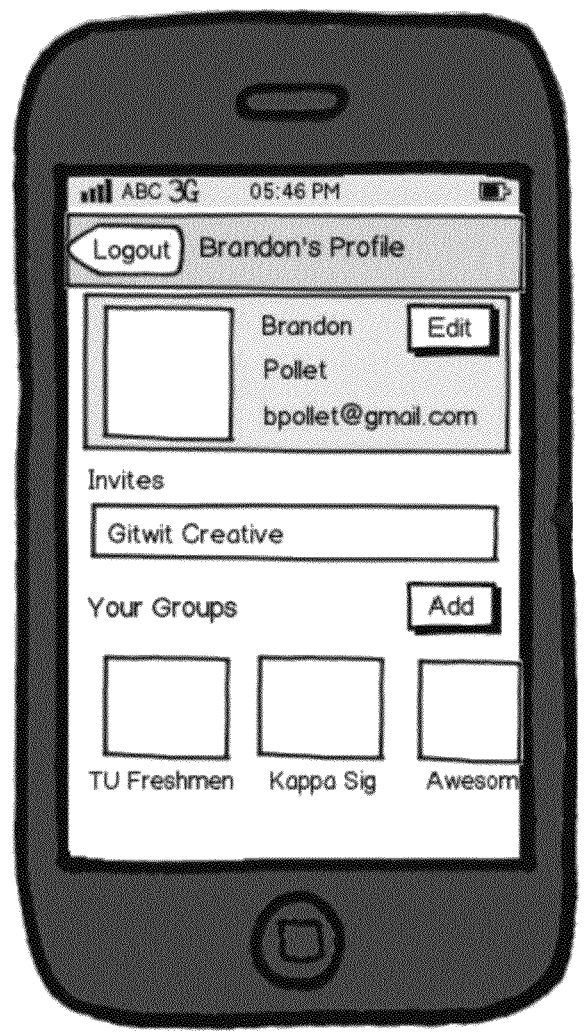
FIG. 3 is another mobile wireframe of the electronic platform.
Figure 4:
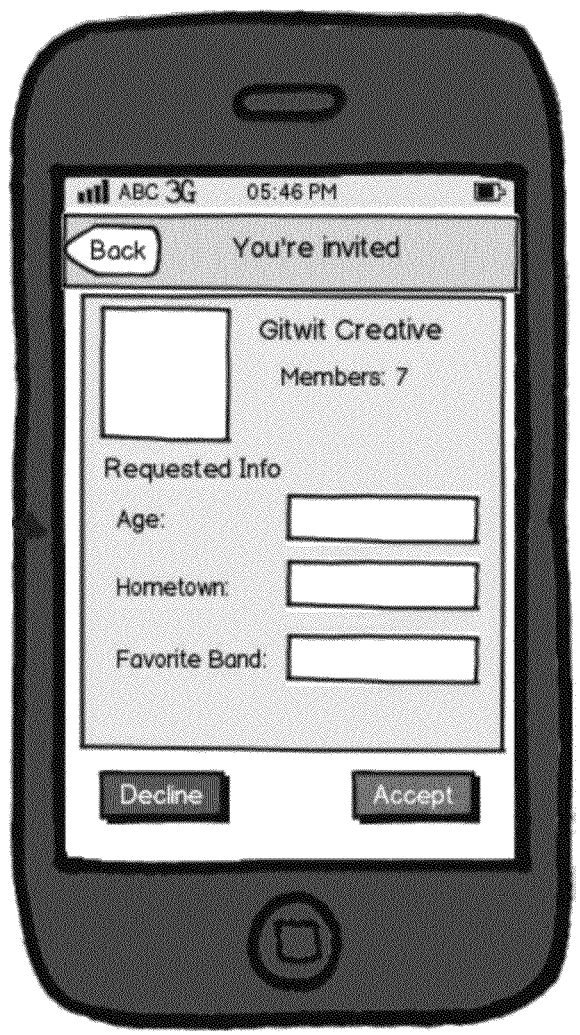
FIG. 4 is another mobile wireframe of the electronic platform.
Figure 5:
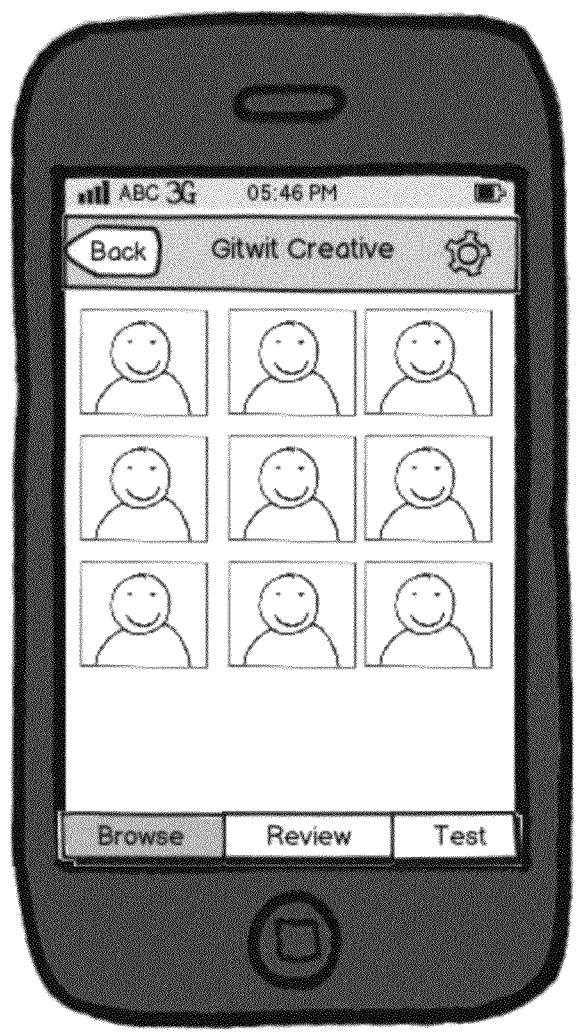
FIG. 5 is another mobile wireframe of the electronic platform.
Figure 6:
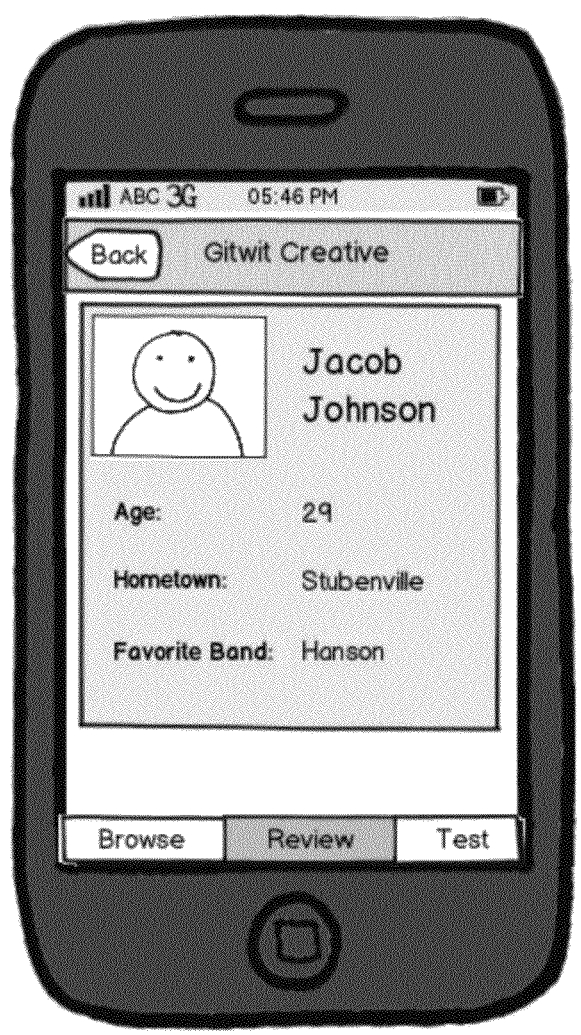
FIG. 6 is another mobile wireframe of the electronic platform.
Figure 7:
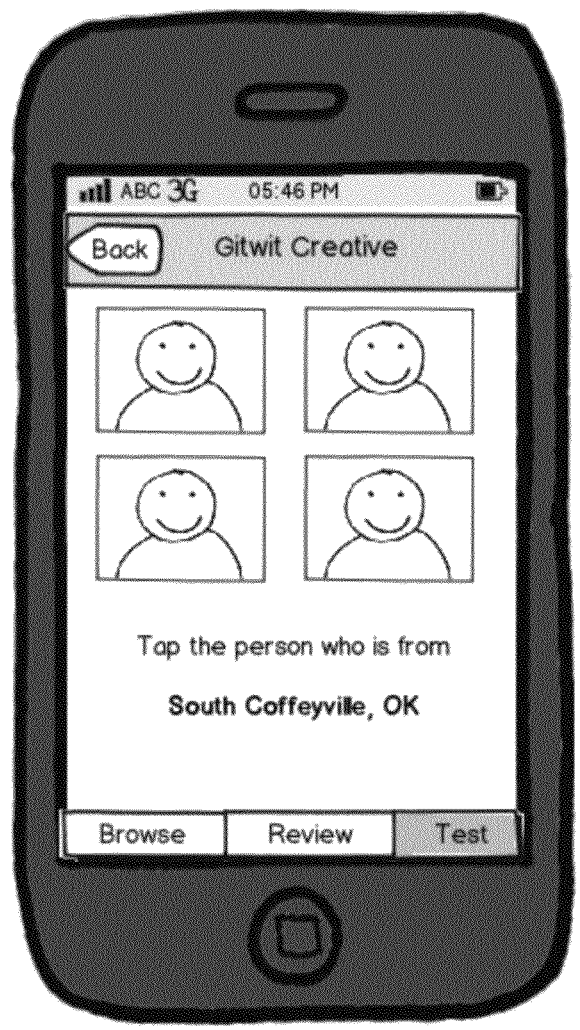
FIG. 7 is another mobile wireframe of the electronic platform.
Figure 8:
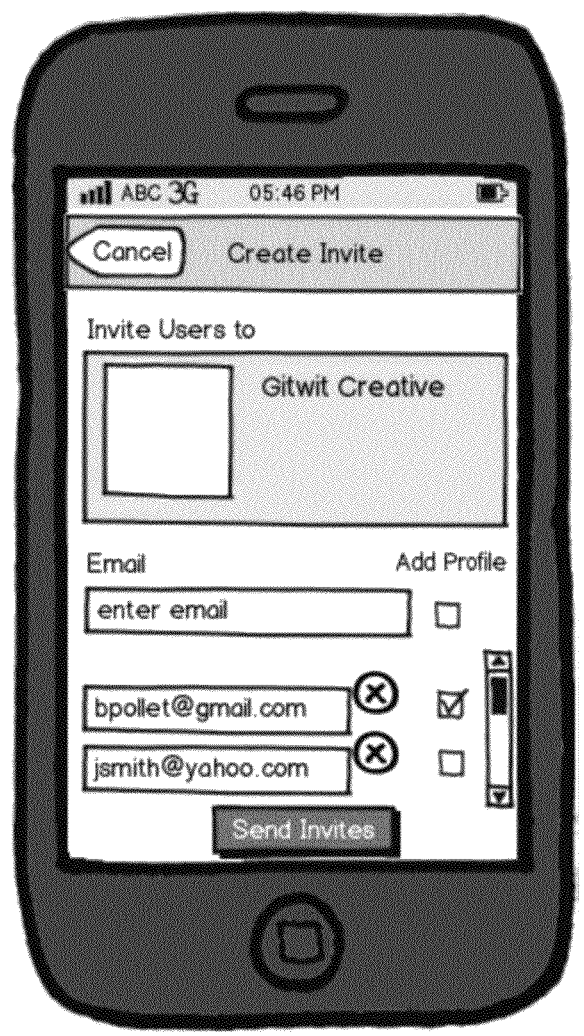
FIG. 8 is another mobile wireframe of the electronic platform.

As illustrated in FIGS. 1 through 8, the electronic platform may be implemented as a mobile-based application. The mobile-based application may take a variety of forms, and may be implemented as a base application or an enhanced application. In the base application, users would perform their respective profile creation and group formation functions on the electronic platform as described above. The application would allow users to perform the flash cards and quiz functions essentially as described above, with the visual aspects of those functions scaled to fit the particular smartphone or mobile device a user accesses the application while using. After downloading the base application, users would first log into the electronic platform through a third party application or using a system-specific username and password, which will in turn populate the users mobile applications with their respective profiles and groups. Users of the base application would have access to the same levels and breadths of functionality concerning the flash cards and quizzes as described below with regard to the web-based application. Visuals would be scaled to fit the respective devices that users would be accessing the mobile application, and all animations and gestures would be adjusted to accommodate multi-touch functionality. In the enhanced application, users are able to have full functionality of the electronic platform, such as sign up, profile and group creation, and flash cards and/or quizzing interfaces, each of which would be scaled to function flawlessly on smartphones and other supporting mobile devices.

Upon downloading the electronic platform, users will be able to access the platform by touching the application icon that appears on their smartphone screens. After touching the application icon, users will be directed to sign in using their email address and password. If users do not already have an account already, they will be able to touch a button that will navigate them to a website within their mobile devices internet browser to then create an account.

After signing in, users will first be directed to their profile page, where they will be able to view their picture and biographical data. Upon touching the "Groups" button, users will be directed to a view of their groups, as well as the number of members in each respective group. Upon touching a specific group, users can view a list of the names and photos of each member of that group. Upon touching a specific member, users will be brought to the profile page of that member. This profile page, identical in format to each user's profile page in each specific group, will display a member's photo and biographical information.

Upon touching the "Flash Cards" button, users will be brought to a list of their groups as well as the number of flash cards (members) in each respective group. Upon touching a specific group, users will begin to experience a flash card quizzing system of the members of that group. Users will first be shown the "primary side" of a flash card, which will be preset by default to be a member's photo. After viewing the "primary side" of the card and attempting to remember the member whose biographical information photo is shown, users can touch the "primary side" anywhere on the screen to reveal the member's biographical information that comprises the "secondary side" of the flash card. A second touch will navigate users to the next flash card's "primary side."

Upon touching the "Edit" button, users will be brought to a screen that will allow them to edit the settings of their flash card quizzes. The flash card settings screen will include a list of biographical data categories common to all members of a specific group. Users can activate and/or deactivate these categories as well as select which category will appear on the "primary side" of each flash card. For example, a user deactivates the "Phone" category from the flash card quiz for his/her group being quizzed upon. After deactivating the "Phone" category and pressing the "Done" button, a user will be brought back to the beginning of the flash card quiz and view the "primary side" of the first card. After touching the screen, in this example, a user would view the "secondary side" of the card, which no longer contains the "Phone" category.

Upon touching the "Quiz" button, users will be brought to a list of their groups as well as the number of quiz questions (members) in each respective group. Upon touching a group, users will begin to experience a multiple choice quiz concerning the biographical information associated with members of the group they are being quizzed upon. Users will see a single given "primary" category and four choices of a "secondary" category. As illustrated, the default "primary" category is "Picture," and the default "secondary" category is "Name."

Upon touching the "Edit" button, users will be presented with adjustable quiz settings nearly identical to the adjustable flash card settings. Users can select and/or deselect categories to be quizzed upon as well as designate a primary category. Users can also toggle "On" or "Off" the ability to "Reshuffle Missed Questions," which will cause (or prevent) incorrectly answered questions to be reshuffled back into the quiz and caused to be quizzed upon at a random point later in the quiz. Users can also change the settings of the "Answer Choices Needed to Get Correct" feature. This feature allows users to decide whether they would like to be quizzed upon all selected biographical data categories about each member of their group (in this example, "Picture" as the "primary" with "Name" and "City" as the "secondary" categories) or about one of the selected biographical data categories as selected at random by the electronic platform.

After pressing the "Done" button and selecting the "All Active" option, in this example, a user would be presented with the "primary" "Picture" category and four answer choices in the "secondary" category of "Name." After selecting one of the four "Name" choices, the user would then be presented with four choices of the second "secondary" category selected, "City," pertaining to the same member they selected a name for on the previous screen. The user must select the correct "Name" and "City" for the associated "Picture" in order to answer the quiz question correctly in this example.

In the quiz settings, users can also select "One Random" as the setting for "Answer Choices Needed to Get Correct." The "One Random" setting will cause the four answer choices given with one "primary" item of data to be a random selection of category from the active data categories selected in the quiz settings. After pressing the "Done" button, in this example, a user would be presented with one "primary" "Picture" as well as four answer choices from the categories of "Name," "City," or "Phone" (in this example, "City"). In the next quiz question, the user in this example would then be quizzed upon the same "primary" data category of a different member of their group, but associated with four answer choices of a different/randomly-selected "secondary" category (in this case, "Name").

As a website-based application, users will utilize a conventional web browser to access the electronic platform. Through the web browser, users of the electronic platform can create profiles, create groups, and use tools that aid in the memorization of knowledge about each of the group's members.

When signing up for the electronic platform, users may choose differing methods of signup, such as based upon the channel (Facebook, email, etc.) through which they receive an invitation to join the service (if they join via an invitation). For example, users sign up using the "Log In with Facebook" feature associated with Facebook and its interface integration Application Program Interface ("API"). Users enter their Facebook username and password on the electronic platform, are then directed to their Facebook account to approve the syncing of the electronic platform with their Facebook information, "Allow" the transaction, and then use their Facebook username and password to sign in to the electronic platform each time they wish to sign in. The electronic platform can also allow users to signup via existing platforms, such as Google and/or Yahoo. Yet further, the electronic platform can also allow users to sign up by creating a username (e.g., an email address) and password directly within the electronic platform. Upon entering this information, the user will receive an email to the given email address asking them to click a link to validate and confirm their account. After clicking the link, the user will be brought to the profile generation page of the electronic platform.

Figure 9:
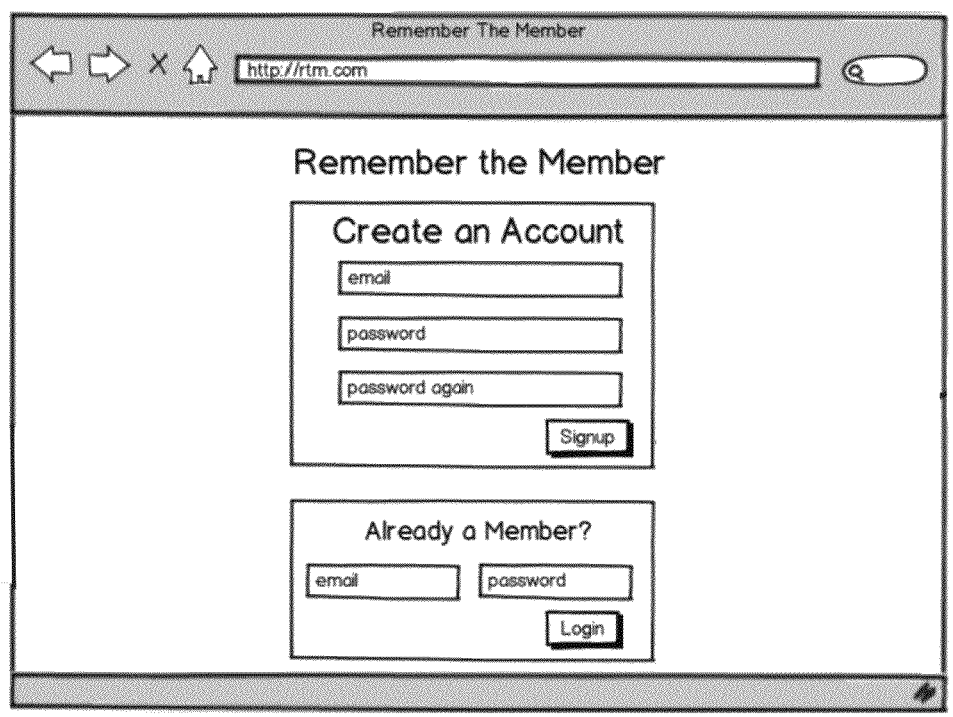
FIG. 9 is a website application wireframe of the electronic platform for user creation and organization of groups of member profiles to aid in memorization biographical information disclosed herein.
Figure 10:
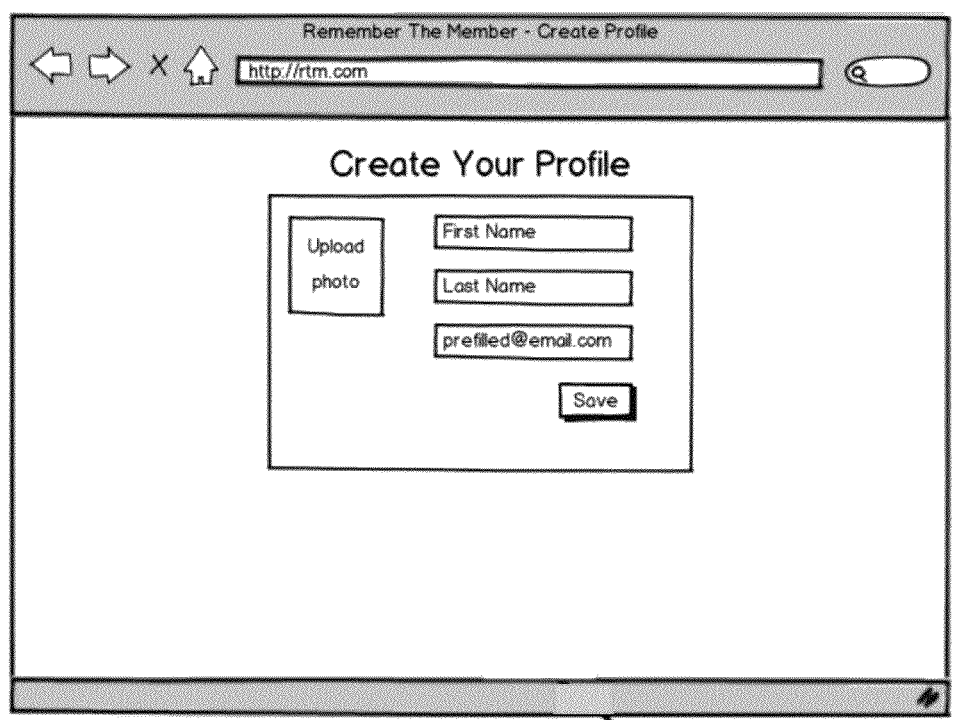
FIG. 10 is another website application wireframe of the electronic platform.
Figure 11:
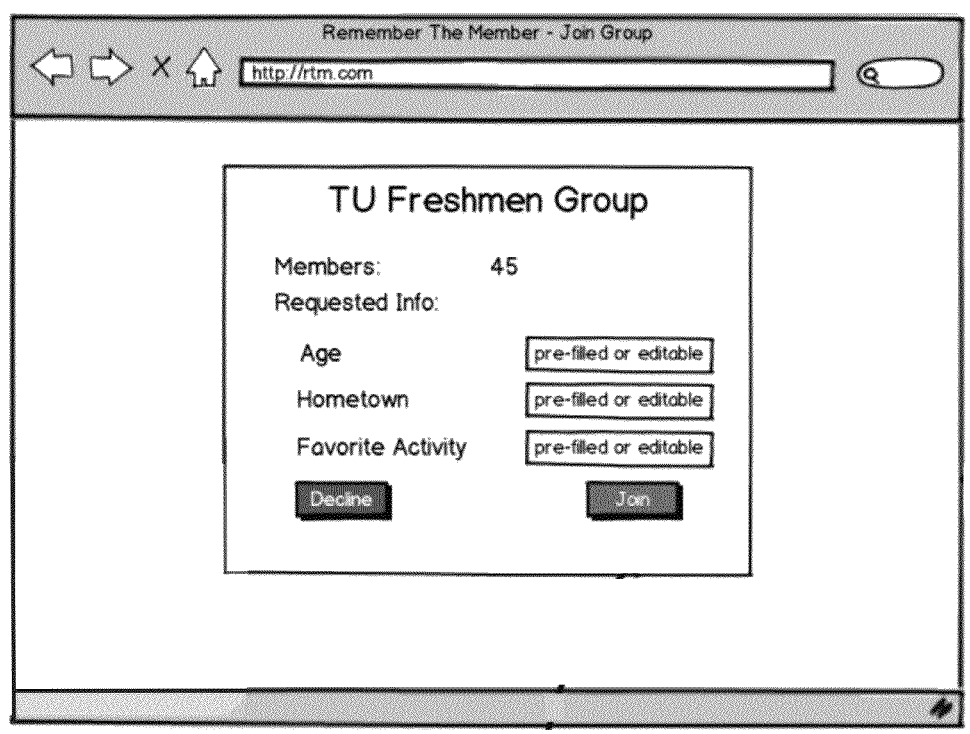
FIG. 11 is another website application wireframe of the electronic platform.
Figure 12:
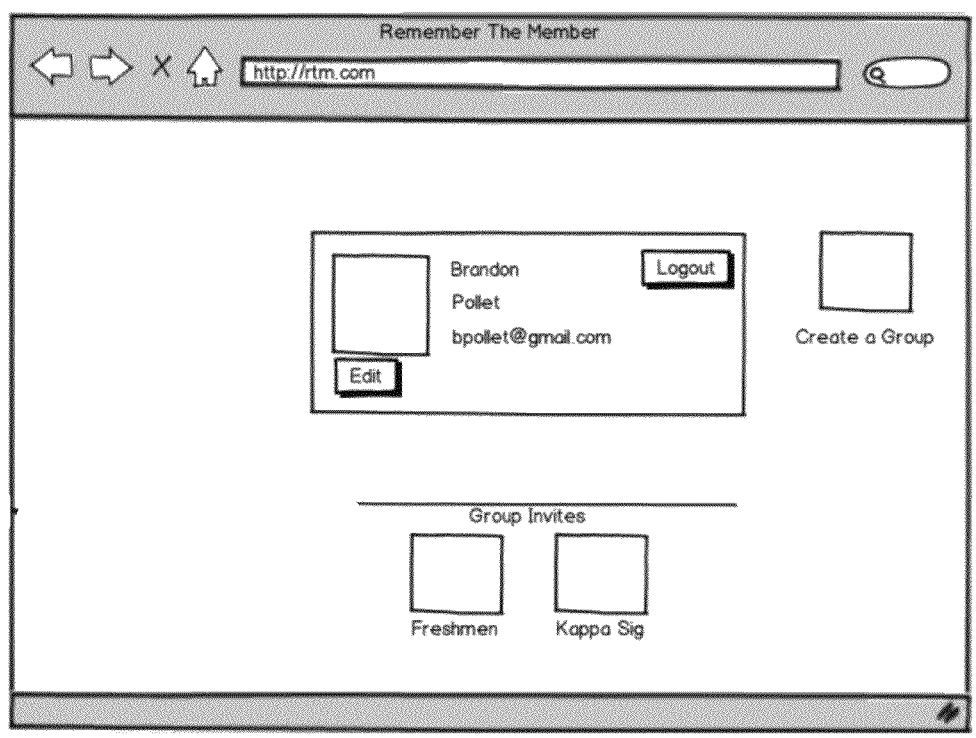
FIG. 12 is another website application wireframe of the electronic platform.
Figure 13:
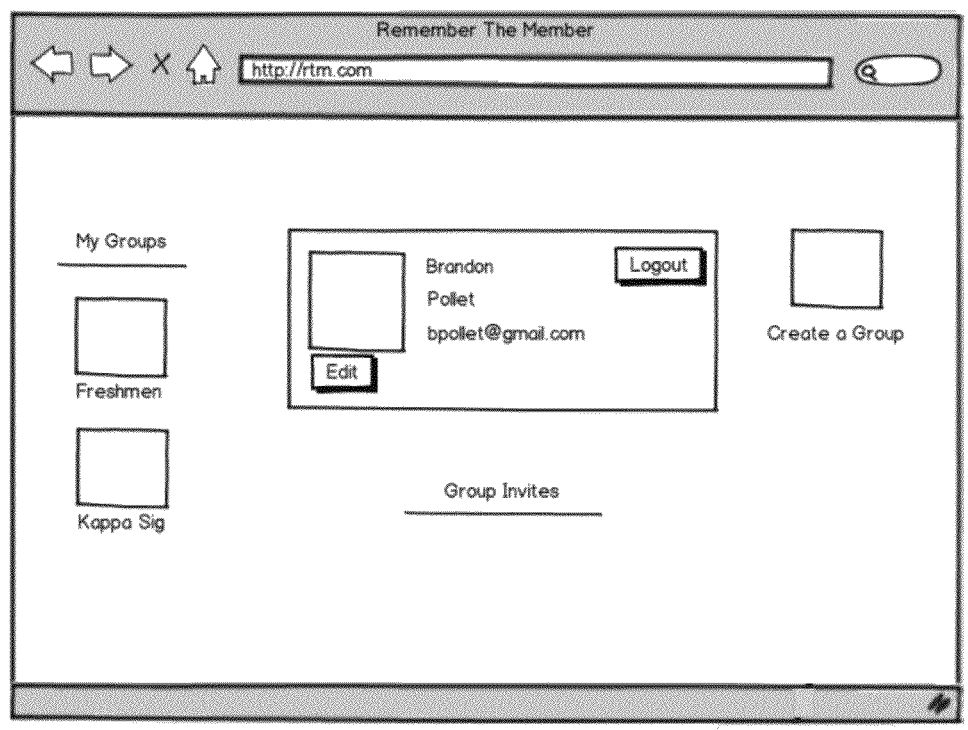
FIG. 13 is another website application wireframe of the electronic platform.
Figure 14:
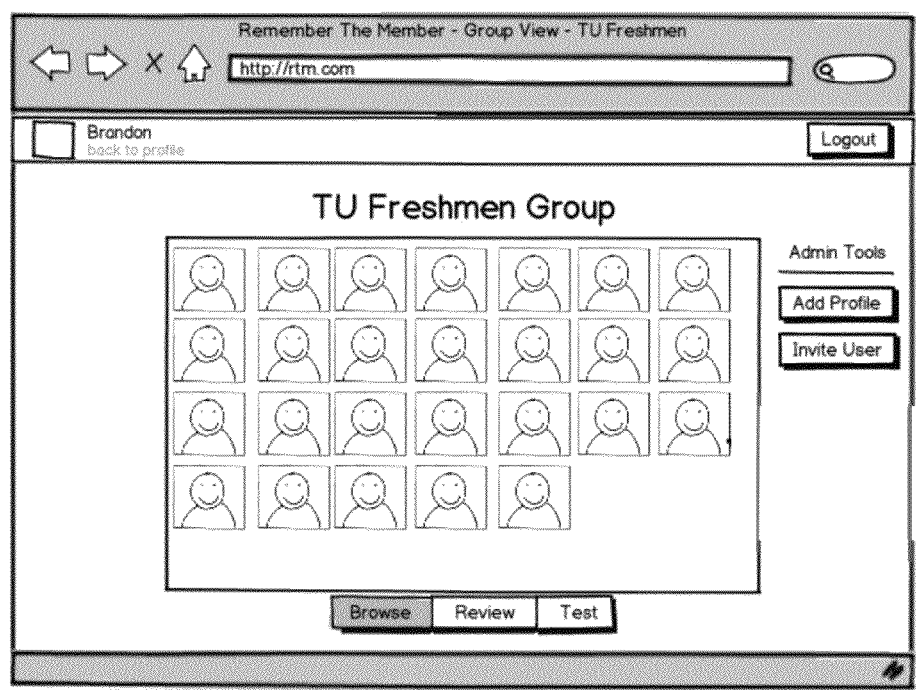
FIG. 14 is another website application wireframe of the electronic platform.
Figure 15:
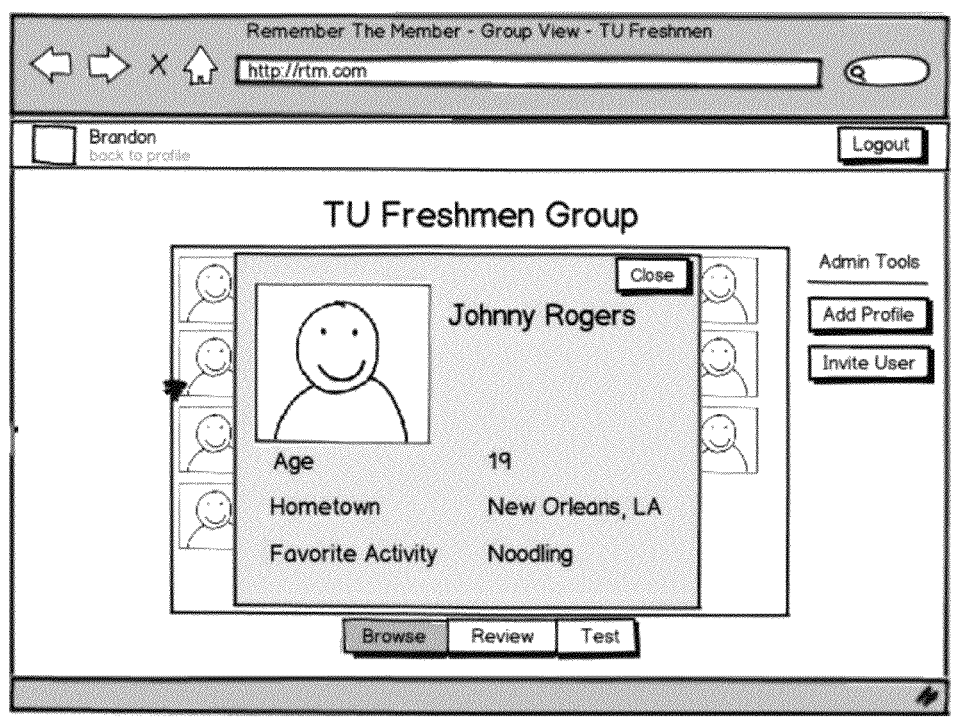
FIG. 15 is another website application wireframe of the electronic platform.
Figure 16:
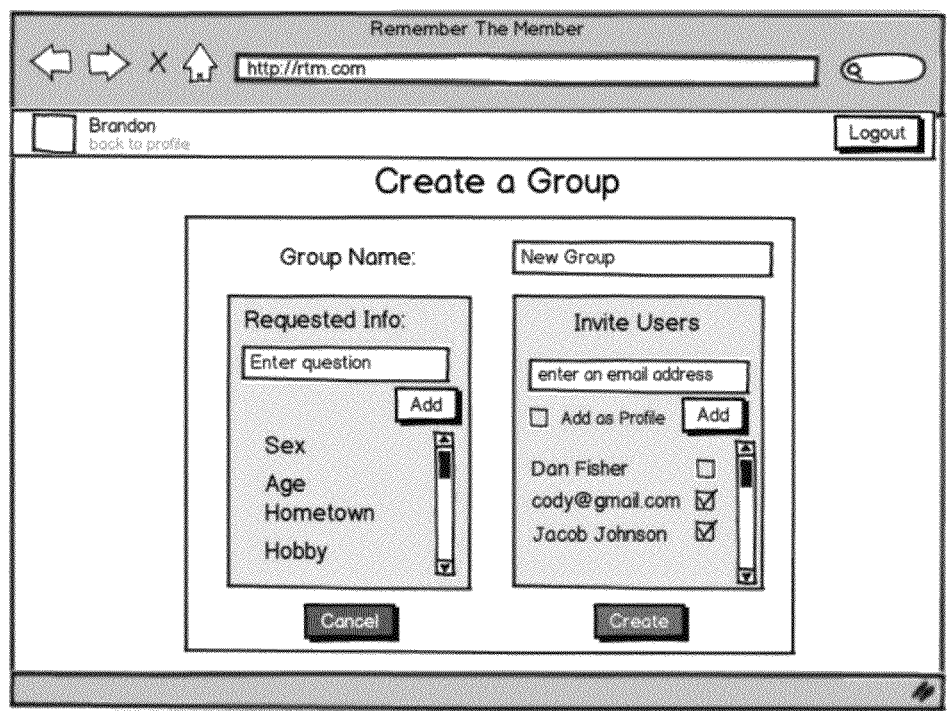
FIG. 16 is another website application wireframe of the electronic platform.

As illustrated in FIGS. 9 through 16, after creating accounts, users will enter basic biographical data into pre-designed fields to generate profiles. Most of these fields will be common to all users, but some may be tailored to specific groups a user could be joining For example, users could enter their names (first and last), the name of the school, group, or organization they will be using the electronic platform to aid in memorizing (if they are not joining a pre-existing group into which they have been invited), their physical address (if desired or required), and their phone number (if desired or required). If joining a pre-existing or a partnership program group, users may need to enter other categories of information necessitated by the group for memorization. For example, if a user is pledging a fraternity that has created a group, that user may need to enter pledging information such as pledge line number or pledge nickname to use for memorization purposes. In addition, users will upload photos of themselves, such as one photo per user, to be used for memorization purposes.

Once a user has created a profile, he or she can begin to create and form a group of users to make use of the tools on the electronic platform, unless the user is joining the electronic platform in response to a sent group request or the group has already been created and established through the partnership program. To create a group, users need to first name the group, as well as select a group photo or logo and upload, if so desired. After selecting a name and photo (if desired), the user then enters email addresses of members they wish to add to their group and click a button to send invitations to those addresses. Once the group has been formed, it becomes the responsibility of the "Admin" user who created the group to manage, maintain, and update the group as necessary.

After a group containing multiple members with saturated profiles has been created, any user in the group can navigate to a section of the website to review the members of the group and their respective items of biographical information in the form of flash cards, such as in a basic form or in a "double-sided" form. A user reviewing basic flash cards will see an image of a card filled with another user from their group's photo and all biographical information given. The user will then be able to click on the card to cycle to the next user in their group's card until they have viewed the cards of all members in their group. If a user wishes to use flash cards for more of a quizzing purpose, he or she can generate "double-sided" cards. In doing so, the user will be shown a list of all biographical fields given to be filled out by the members of the group upon creating profiles (including photo) and will be able to "check" or "uncheck" boxes next to those biographical fields to select the ones on which he or she would like to be "quizzed." The user will also designate one field as the "primary" field, which will be shown alone on one side of each of the members of the group's flash cards. After completing this selection, the user will then cycle through the flash cards. For example, if a user selected the category of "photo" as the primary field and began to cycle through the flash cards, he or she would first see a group member's photo on a card without any information surrounding it, would try to discern the name and relevant biographical information of the person in the photo, and would click on the card to reveal the name and biographical information on the "other side" of the card.

In addition to flash cards, users may also create and engage in multiple-choice quizzes concerning the members of their group and each member's respective biographical information. When a user navigates to the quiz interface of the electronic platform, he or she will have the opportunity to immediately engage in a pre-designed basic quiz generated by the electronic platform. This quiz will show a user a picture of one of the members of their group as well as four names of members of their group. The user can then select which of the four names they believe belong to the member in the picture. If the user answers correctly, the member just tested will be removed from the quiz. If the user answers incorrectly, that member will be randomly added back into the quiz at some later point. The additional options of providing scoring and answer breakdown after the quiz is completed must still be investigated and discussed.

In the quiz interface of the electronic platform, a user will also have the opportunity to create a more detailed quiz than the basic quiz described above. The first step in generating this quiz is essentially identical to that of creating double-sided flash cards in that a user will select which biographical categories to be quizzed upon as well as a "primary" category, which will be the "given" piece of each quiz question, with the other categories comprising the answer choices. The processes for correct and incorrect answers will remain the same as described in the basic quiz above. The user will have two options of quizzing method once the biographical fields have been selected: being quizzed on "random" fields or "all" fields. In the random fields quiz, a user will be given one item of primary information as well as four items of data from another category. The category from which the four items of data come will vary from question to question (depending upon how many secondary categories the user selected to be quizzed upon) while the primary given item category will remain constant. For example, if "photo" is the primary category, a user will consistently be given a photo with which he or she may have to match one of four names for one question, and one of four phone numbers for the next question, etc. In the all fields quiz, a user will be given one item of primary information as well as four items of data from each category selected to be quizzed upon. To answer a question correctly, the user must successfully match the correct data item from each category's four choices given to the one primary item of information.

Additionally, the electronic platform's simplicity and flexibility allow for it to be easily tailored to the specific demands of many potential partner groups and organizations. Under the partnership program, the electronic platform is customizable to create a full-service, streamlined membership, group, and flash card and quizzing structure that will best suit the partner's needs. The electronic platform is useful for a wide array of groups and organizations, such as college Greek institutions (fraternities and sororities), businesses with memorization and membership needs, conferences, corporate company events, educational classes at all academic levels, college campus clubs and student organizations, non-profit organizations, and athletic teams. From visual design to functional specifications, there are numerous ways in which the electronic platform can be tailored to meet the desires of partners. For example, the electronic platform's color scheme and layout can be tailored to match a partner's desired color scheme, as well as to add partner organizational logos and images.

The functional processes implemented to manage the sign up, profile creation, and group formation aspects of the electronic platform can be adjusted to create a more streamlined and less user-intensive experience for partners and their organizational group members who will be using the platform. If the partner so desires, the electronic platform can be specifically tailored for the partner organization, as well as tailored with unpopulated profiles for all of its members. This in turn will remove the sign up and group formation processes altogether as members that have been pre-selected by the partner to join and use the service, will simply need to sign in to the service using their company, organizational, or given email and a temporary password given to them before sign up. User profiles can be custom designed with the biographical fields for which the partner wishes each of its members to provide data.

Partners may also pre-select the construction of its group's flash cards and quizzes by conveying the optimal biographical fields and primary categories to best suit their members' needs for memorization. In addition, partners may potentially be granted control of the advertisements that appear on their tailored platform. These advertisements include standard website and mobile application banners and side-banner advertisements. Whether the partners choose to outsource these advertisements, select them internally, or choose to have no advertisements whatsoever, they will have access to the precisely targeted audience of their own organizational members.

The electronic platform is a multi-faceted, group-enhancing, and memorization-aiding platform that provides a wide array of benefits to numerous classifications of persons and groups that will become users and partners. The electronic platform provides a simple, but greatly needed, service that does not exist in its nature in website or mobile application form. Students, members of Greek organizations, corporate employees and executives, athletes, conference attendees, educators, and countless others often face the task (and in many cases, the problem) of memorizing the names, faces, and biographical information of members of a group. Certain services currently exist to create flash cards and rudimentary tests and surveys, but the electronic platform provides individuals with a service that makes the act of memorization and increasing group familiarity social, "gamifies" the experience, and connects users to members of their groups on a much deeper level than would be possible without their use of the electronic platform. Furthermore, in the current state of service and platform offerings, companies and organizations possessing the need to facilitate the familiarization, greater interaction, and memorization of the members of their groups and/or event attendees must relegate themselves to the use of insufficient methods such as Microsoft PowerPoint®, nametags, business cards, paper flash cards, and others similar to these methods. Whether they choose to become partners to create a tailored and streamlined service to their specific needs or to use the basic platform, companies and organizations gain access to a set of tools that will drastically improve the efficiency, effectiveness, participation, and fun of group memorization when they use the electronic platform.

Whereas, the systems and methods have been described in relation to the drawings and claims, it should be understood that other and further modifications, apart from those shown or suggested herein, may be made within the spirit and scope of this invention.

What is claimed is:

1. A computerized system for forming and organizing groups of member profiles, said system comprising:
    a computer network wherein a plurality of computers have access to said computer network; and
    an electronic platform in said computer network, wherein said electronic platform is configured to receive requests from any one of said plurality of computers, said electronic platform comprising:
        a database comprising biographical information of a plurality of individual members, said database organized into groups of individual member profiles, and said biographical information comprising name, address, city phone, number and/or a photograph of each of said individual members; and
        an interface in communication with said database, said interface configured to access a particular group of member profiles, said interface configured to aid in memorization said biographical information of said individual members within said particular group of member profiles; said interface of said electronic platform further comprising:
            electronic flash cards comprising a primary side and a secondary side, said primary side of said flash cards consisting of said photograph of one of said individual members, said secondary side consisting of said biographical information corresponding to said one of said individual members; and
            multiple choice quizzes comprising a primary quiz category and a plurality of secondary quiz categories, said primary quiz category comprising said photograph of one of said individual members, said secondary quiz categories comprising said name, address, city or phone number of said individual members in said particular group of member profiles.

2. The system of claim 1 wherein said computer network comprises the internet or a host-based computer system.

3. The system of claim 1 wherein said electronic platform comprises a web-based application or a mobile-based application.

4. The system of claim 1 wherein said database further comprises organizational information about said groups of individual member profiles.

5. The system of claim 1 wherein said database further contains a plurality of display formats, wherein each of said display formats specify a display format.

6. The system of claim 5 further comprising a display page composer means for merging said information in said database with one of said display formats to generate a display page which is communicated to said electronic platform.

7. A computer-implemented method for memorizing biographical information of a group of individual member profiles using the system of claim 1.

8. The method of claim 7 wherein said database further comprises organizational information about said groups of individual member profiles.

9. The method of claim 7 wherein said database further comprises a plurality of biographical data categories common to all of said individual members or to all of said groups of individual member profiles, and said biographical data categories configured to be selectively activated and deactivated for display on said electronic flash cards and/or said multiple choice quizzes.

10. The method of claim 7 wherein said interface of said electronic platform is configured to alternate between said primary side and said secondary side of said electronic flash cards in response to a user selection.

11. The method of claim 7 wherein said interface of said electronic platform is configured to display said primary quiz category of said multiple choice quizzes and to capture a user selection of one of said secondary quiz categories in response to said display of said primary quiz category.

12. The method of claim 7 wherein said interface of said electronic platform is configured to display each of said individual members within said particular group of said individual member profiles.

13. The method of claim 7 wherein said primary quiz category consists of said photograph of said one of said individual member profiles, said secondary quiz categories consist of said biographical information corresponding to said one of said individual member profiles.

14. The system of claim 1 wherein said database further comprises a plurality of biographical data categories common to all of said individual members or to all of said groups of individual member profiles, and said biographical data categories configured to be selectively activated and deactivated for display on said electronic flash cards and/or said multiple choice quizzes.

15. The system of claim 1 wherein said interface of said electronic platform is configured to alternate between said primary side and said secondary side of said electronic flash cards in response to a user selection.

16. The system of claim 1 wherein said interface of said electronic platform is configured to display said primary quiz category of said multiple choice quizzes and to capture a user selection of one of said secondary quiz categories in response to said display of said primary quiz category.

17. The system of claim 1 wherein said interface of said electronic platform is configured to display each of said individual members within said particular group of said individual member profiles.

18. The system of claim 1 wherein said primary quiz category consists of said photograph of said one of said individual member profiles, said secondary quiz categories consist of said biographical information corresponding to said one of said individual member profiles.

\* \* \* \* \*